May 23, 1939.   F. H. WEEKS ET AL   2,159,065
SCALE BOX AND SUSPENSION THEREFOR
Filed June 1, 1936
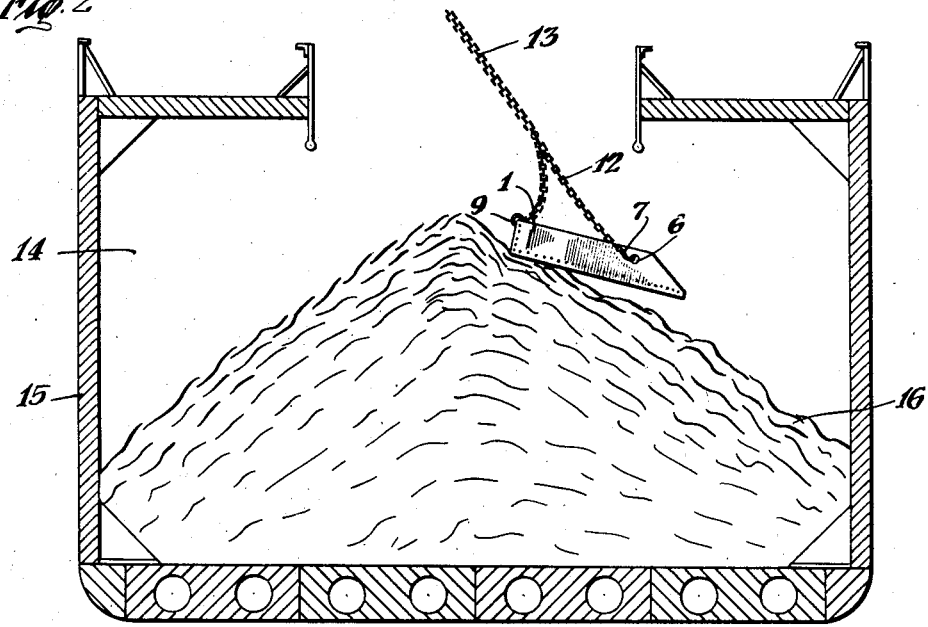
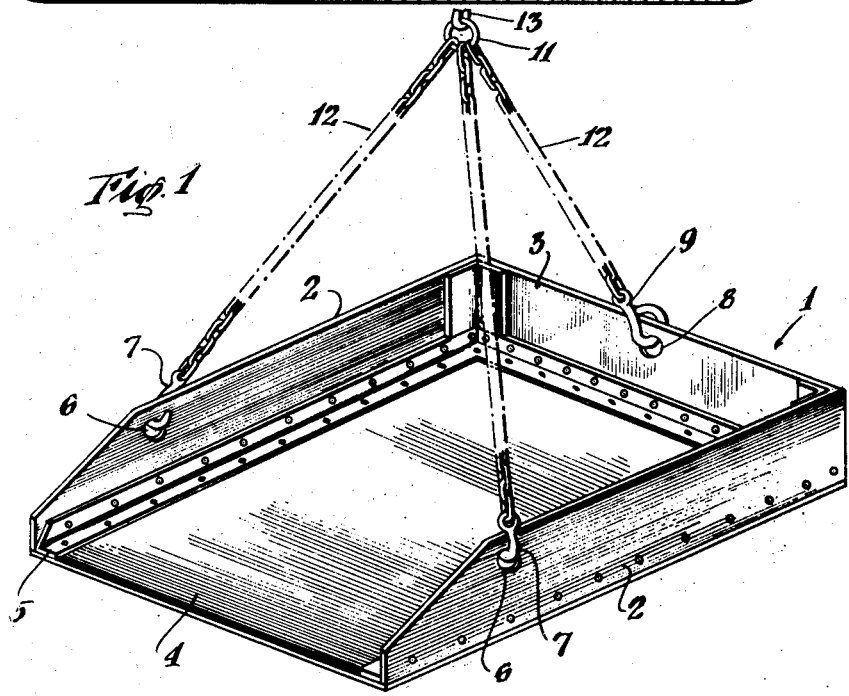
INVENTORS
Francis H. Weeks
BY Richard B. Weeks
Louis Burger
ATTORNEY Patented May 23, 1939

2,159,065

UNITED STATES PATENT OFFICE 2,159,065

SCALE BOX AND SUSPENSION THEREFOR

Francis H. Weeks and Richard B. Weeks, New York, N. Y.

Application June 1, 1936, Serial No. 82,699

2 Claims. (Cl. 294—73)

This invention relates to a scale box and suspension therefor and more particularly to a metal scale box for transferring bulk material.

An object of the invention is to provide a scale box and suspension which can easily transfer a large amount of bulk material, such as scrap metal, in a short period of time and with a relatively small amount of labor.

Our invention comprises a scale box and suspension havinging a flat bottom, a back wall, two side walls and an open end. Suspension means are connected to the box adjacent the back wall, and suspension means releasable by slacking the suspension cable are connected to each side wall of the box adjacent the open end. Said last mentioned suspension means may take the form of hooks entering loosely in a hole in each side of the box from the outside. The scale box is preferably substantially rectangular and has a substantially flat bottom.

The box may be filled, for example on a dock or lighter, by hand or by means of a magnet, or other means, and transferred to a ship by means of a crane. The box is substantially free of external bracings, which in practice would catch on the coaming or other parts of the ship. With such a scale box, large amounts of bulk material can be loaded with one swing of the crane and the contents thereof completely dumped wherever desired. When the scale box deposits the scrap metal into the ship's hold, the substantially flat bottom of the scale box allows the box to slide down the pile of scrap metal previously dumped. The cable is then slacked, thereby releasing the side wall suspension means. The cable or chain carrying the scale box is raised, whereupon the scale box is brought to a vertical position by pull on the box exerted by the suspension means connected to the box adjacent the back wall, thereby dumping the contents thereof. The scale box is returned for refilling, and the side wall suspension means are reinserted in their respective openings.

The invention will be described with respect to a metal scale box for loading scrap metal in ships, but the invention is not to be so limited and applies equally as well to transferring bulk material other than scrap metal to objects or places other than ships.

In the drawing, Fig. 1 is a perspective view of the scale box, and

Fig. 2 is a vertical sectional view of a ship's hold being loaded by the scale box.

A metal scale box 1 has metal side walls 2, 2 and metal back wall 3. The walls 2 and 3 are secured to the bottom 4 in any suitable manner as for example by means of angle irons 5 riveted thereto. Side walls 2 have openings 6, 6 adapted to receive releasable suspension means in the form of hooks 7, 7 entering from the outside and back wall 3 has at least one opening 8 adapted to receive non-releasable suspension means in a form of a ring 9. Hooks 7 and ring 9 are connected to a ring 11 by means of chains or cables 12, and ring 11 is connected to a chain or cable 13 which is operated by a crane (not shown).

The metal scale box on a dock, barge or elsewhere is loaded with scrap metal and the crane (not shown) transfers the scale box and contents to the hold 14 of a ship 15. As shown in Fig. 2, the hold of the ship is partially filled with scrap metal 16, and the scale box 1, rests on the pile of scrap metal. When the cable 13 is slackened, the scale box 1 slides down the pile of scrap metal and the hooks 7 are released from the openings 6. When cable or chain 13 is raised, the scale box is lifted in a vertical position, permitting all of the scrap metal therein to be dumped.

A scale box according to this invention will not bend from the load therein, even without external or inside bracings. With a scale box 6 ft. wide, it is possible to lift three or four tons of scrap metal and deposit the same in the ship. This results in a great increase in speed of loading and a considerable saving in labor, while the absence of external bracings or projections decreases greatly the liability of catching on the coaming of the ship.

Modifications may be made without departing from the spirit of the invention. For example, suspension means 9 may take the form of a hook inserted in the opening 8 from the inside. When the scale box slides down the pile of scrap metal, the contents of the box will hold the hook in position in the opening. The foregoing description is by way of illustration and not of limitation, and we are to be limited only by the appended claims in which we have endeavored to claim the inherent novelty.

We claim:

1. A scale box and suspension having a substantially flat and smooth bottom, said box having one back wall, two side walls and an open end, a carrying cable, flexible suspension means connected to said cable and to said back wall, and flexible suspension means connected to said cable and to each side wall adjacent said open end, said last mentioned suspension means being releasable on an inclined surface by slacking said cable, said box being substantially free from external projections on the top and bottom thereof and adapted to slide down an uneven inclined surface.

2. A scale box according to claim 1 in which said releasable suspension means are hooks loosely entered from the outside of said box through holes in the side walls of the same.

FRANCIS H. WEEKS.
RICHARD B. WEEKS.